Patented Mar. 28, 1944

2,345,528

UNITED STATES PATENT OFFICE 2,345,528

ALKYD RESIN AND METHOD OF PREPARING THE SAME

Theodore F. Bradley, Stamford, Conn., assignor to American Cyanamid Company, New York, N. Y., a corporation of Maine No Drawing. Application April 15, 1941, Serial No. 388,647

2 Claims. (Cl. 260—22)

This invention relates to a new class of alkyd resins and methods of preparing the same.

Alkyd resins are formed by the reaction of polyhydric alcohols with polycarboxylic acids with or without modifying substances. Although trihydric glycerol is the polyhydric alcohol ordinarily employed in the manufacture of alkyd resins, dihydric, tetrahydric and hexahydric alcohols have also been used to give resins of particular characteristics. Glycol, pentaerythritol and sorbitol may be mentioned as examples of each.

I have found that a new class of alkyd resins of greater hardness, higher melting point and of increased rate of cure and, with the oil fatty acid modified alkyds, of much faster drying time, may be produced by replacing at least a substantial portion of the polyhydric alcohol with dipentaerythritol.

Dipentaerythritol is a hexahydric ether alcohol of the formula

$(CH_2OH)_3C.CH_2OCH_2.C(CH_2OH)_3$ and is unique in that it contains six primary alcohol groups. It is to these six primary alcohol groups that many of the unusual properties of my new alkyd resins are due. Dipentaerythritol itself is a white powder having a melting point of 221° C., a hydroxyl value of 1310 and a very low solubility in water and organic solvents. Most esters of this alcohol with mono- and polycarboxylic acids share the water resistance of the alcohol so that the resins prepared therefrom, including those modified with drying oil fatty acids, are characterized by excellent water resistance.

My new class of alkyd resins are prepared in accordance with my invention by reacting dipentaerythritol with a polycarboxylic acid, or anhydride thereof, such as phthalic, diphenic, 1.8-naphthalic, succinic, malic, tartaric, maleic, fumaric, citric, adipic, suberic, sebacic, diglycolic, camphoric, tetrahydrophthalic and the like, either singly or in admixture. Ordinarily I use an excess of dipentaerythritol over the theoretical quantity needed for complete esterification of the acid since excess acid in the resin is generally considered undesirable whereas a small excess of dipentaerythritol is harmless. Also, an excess of dipentaerythritol is desirable in order to compensate for the formation of dipentaerythritol ethers which may take place during the course of the reaction. Appropriate amounts would, for example be 3 moles of phthalic anhydride and 2 moles plus 5% to 30% excess of dipentaerythritol.

Alkyd resins may be prepared in accordance with my invention in much the same manner as employed in the preparation of alkyd resins generally due allowance being made, however, for the increased reactivity of dipentaerythritol over polyhydric alcohols employed heretofore. Thus, for example, resins may be prepared by the simultaneous process simply by heating together dipentaerythritol and a polycarboxylic acid until the desired degree of reaction has been reached. Similarly, modified alkyds may be prepared by the process by heating dipentaerythritol with polycarboxylic acids and monocarboxylic acids, either saturated or unsaturated or other modifying agents. When heating with polyunsaturated fatty acids the reaction should be conducted in an atmosphere free from oxygen so that discoloration and premature drying may be avoided. An inert atmosphere over the reaction mixture should also be employed when drying or semi-drying oil modified alkyds are being prepared.

It should be understood that substantial amounts of dipentaerythritol should be used in order to obtain the advantages of the invention. Obviously, the substitution by dipentaerythritol of only a small part of the glycerine, pentaerythritol, or other polyhydric alcohols that have previously been used will result in only minor improvements, and I have found that substantial quantities on the order of 30-40% by weight of the total amount of polyhydric alcohol should be employed in order to obtain the improvements in hardness, water resistance, and other properties referred to above.

Because of the great reactivity of dipentaerythritol the reaction with polybasic acids alone as in the production of unmodified alkyds proceeds rapidly and gelling may occur before the reaction is complete and it is difficult to obtain a product with an acid number of less than 200. The addition of rosin, however, tends to overcome gelation in proportion to the amount of rosin used and allows the acid number to be carried lower. Acetic anhydride may also be used for this purpose. Non-drying oils, saturated aliphatic acids as acetic, butyric, palmitic, etc., and lower alcohols such as ethyl and butyl as well as glycol, glycerol, etc., also tend to prolong the gelling period and their use enables a product of lower acid number to be obtained.

The unmodified alkyd resins prepared from dipentaerythritol with most dibasic acids are very hard, brittle materials with high melting points. The rosin modified product is also a hard, brittle material. Monohydric alcohols such as ethyl, butyl, benzyl, cyclohexyl, etc., and lower polyhydric alcohols such as glycol and glycerol when added to the reaction mixture tend to soften the product, lower its melting point and increase its solubility in organic solvents. Saturated aliphatic acids such as acetic, butyric, palmitic, stearic, etc., also have a softening effect on the resin and increase its solubility.

Although the straight alkyds described above are useful for many purposes such as impregnating paper in the manufacture of imitation parchment, in finishing textiles, as a binding agent in abrasive blocks, etc., I find my invention is of greatest value in the preparation of fatty acid modified alkyd resins, and particularly those which are oxygen convertible. These products are prepared by reacting dipentaerythritol, a polycarboxylic acid and an unsaturated monocarboxylic acid or an oil which on hydrolysis yields unsaturated fatty acids.

Because dipentaerythritol has six primary alcohol groups it is extremely reactive and any one or all of the alcoholic OH groups may be reacted with unsaturated fatty acids and the resulting molecule may therefore have an extreme high degree of polymeric functionality. This high degree of functionality enables the compound to polymerize in a multiplicity of ways with great rapidity. Air-drying modified alkyds may for this reason be prepared from semi-drying oils, or acids derived therefrom, and the drying properties of modified alkyds prepared from drying oils or acids derived therefrom may be improved by the use of dipentaerythritol in accordance with my invention.

As in the production of modified alkyd resins generally I may use any of the oils commonly used, whether they be drying, semi-drying or non-drying. The non-drying oils are of value principally on account of their plasticizing effect as described above since the fatty acids derived therefrom are largely saturated and the dipentaerythritol esters of these non-drying oil fatty acids do not polymerize readily. The semi-drying oils such as palm, cottonseed, corn and sunflower seed oils contain larger percentages of unsaturated fatty acid triglycerides and when the fatty acids derived therefrom are combined with dipentaerythritol the polymeric functionality of the compound is appreciably increased and the product polymerizes more rapidly than does the corresponding triglyceride.

When preparing modified alkyds using dipentaerythritol with polybasic acids and drying oils such as soya bean oil, linseed oil, oiticica oil, tung oil, Perilla oil, fish oil and the like the resulting product has a much faster drying rate than materials prepared from other polyhydric alcohols heretofore used. Again, this improved drying is due to the greater polyfunctionality of the dipentaerythritol esters in the product.

Dipentaerythritol may also be used to advantage with oils which have been modified to improve their drying properties such as dehydrated, or dehydroxylated, castor oil, or the isomerized vegetable oils disclosed and claimed in my copending application, Serial No. 378,060, filed February 8, 1941. The fatty acids of these oils contain a substantial content, from 20% to 45%, of conjugated double bonds. The drying properties of these compounds are also further improved by combination with dipentaerythritol in accordance with my invention.

In addition to the various triglycerides enumerated above the various mono and diglycerides of the corresponding unsaturated fatty acids may also be employed. It will be understood of course that during the course of the reaction when using the glyceride esters of fatty acids an ester interchange occurs and glycerol is split out allowing the fatty acids to combine with dipentaerythritol. The glycerol, unless removed, modifies the properties of the alkyd resin obtained.

As stated above I may use fatty acids obtained by the hydrolysis of the various oils mentioned above when the presence of glycerol in the reaction is undesirable. In addition to the mixed fatty acids obtained from the various animal or vegetable oils mentioned above I may use the more or less pure aliphatic saturated and unsaturated monocarboxylic acids. As stated above the saturated monocarboxylic acids are of value principally on account of their plasticizing effect and to reduce the tendency of the reaction mixture to gel prematurely. The unsaturated and particularly the polyunsaturated monocarboxylic acids such as linoleic, linolenic and eleo-stearic are employed to obtain products having rapid air-drying properties.

As will be apparent from the specific examples which follow the resins of my invention may be used for many purposes analogous to the way in which ordinary alkyd resins have hitherto been employed. The modified alkyd resins of my invention are particularly useful on account of their rapid air drying properties and improved water resistance in the preparation of printing inks, including painting pastes to be applied to cloth, in the manufacture of linoleum, in the preparation of rapid drying enamels, paints, varnishes and the like. They are compatible with cellulosic esters such as cellulose nitrate, cellulosic ethers such as ethyl celluose, urea resins and melamine resins, cyclized rubber derivatives, and many other materials with which my resins may be mixed to provide compositions of improved properties.

The invention will be described in greater detail by the following specific examples. It will be understood, however, that while these examples describe certain of the more specific aspects of the invention they are given primarily for illustrative purposes and the invention is not to be limited thereto but is to be construed broadly within the scope of the appended claims.

*Example 1*

280 parts by weight of dehydrated castor oil fatty acids, 135 parts of dipentaerythritol and 148 parts of phthalic anhydride were charged into a reaction vessel and heated in the presence of a flow of carbon dioxide as follows:

| Time | Temp. |
| --- | --- |
| Hrs. | °C. |
| 0.8 | 180 |
| 2.2 | 210 |
| 3.2 | 214 |

A portion of the resulting resin was dissolved in mineral spirits (Solvesso No. 2) to a 65% solution. The viscosity at 48.5% solids was U—V (Gardner-Holdt) and the acid number of the resin (solids basis) was 35.6.

This resin was tested with a pentaerythritol resin of equivalent oil length and otherwise fully comparable. Both of the resin solutions were thinned with mineral spirits and flowed on tin panels and heated for 10 minutes at 110° C., at which time the dipentaerythritol resin was found to have dried tack-free and to be noticeably harder than the corresponding pentaerythritol resin. The panels were then immersed in distilled water for 30 minutes, during which time the dipentaerythritol resin showed no whitening while the pentaerythritol resin exhibited a moderate amount of whitening.

*Example 2*

725 parts by weight of dipentaerythritol, 888 parts of phthalic anhydride and 1960 parts of dehydrated castor oil were charged into a reaction vessel and heated in an atmosphere of carbon dioxide in 5 hours up to 190° C. and held at this temperature for 12 hours more. The resulting resin had an acid number of 30 and a 50% solution in toluene had a viscosity of D on the Gardner-Holdt scale. The resin was compounded with a pigment and printed on cloth with excellent results. This printing paste was particularly characterized by its very fast cure.

*Example 3*

293 parts by weight of soya bean oil and 82 parts of dipentaerythritol were heated in an atmosphere of nitrogen at 250° C. until the reaction mixture was clear or until 1 part of the ester was completely soluble in 2 parts of methanol. 148 parts of phthalic anhydride was then added and the heating continued at 220° C. until an acid number below 10 was obtained. This composition has application as a long oil enamel vehicle for brushing, such as in the preparation of architectural enamels.

*Enamel 4*

293 parts by weight of soya bean oil and 82 parts of dipentaerythritol were heated in an inert atmosphere to 250° C. until the solution was clear or until 1 part of the ester could be diluted with 2 parts of methanol. 140 parts of soya bean fatty acids and 99 parts of phthalic anhydride were then slowly added to the reaction mixture and the resin finished at 250° C. for an acid number below 10. This composition is also useful as a long oil enamel vehicle for brushing enamels.

*Example 5*

1120 parts by weight of soya bean fatty acids, 148 parts of phthalic anhydride and 254 parts of dipentaerythritol were all charged into a reaction vessel and heated under an inert atmosphere to 250° C. and held at 250° C. until the acid number of the reaction mixture was reduced to 6.0 based on the solid resin and a viscosity of W on the Gardner-Holdt scale. This material is dilutable with mineral spirits in all proportions.

*Example 6*

148 parts by weight of phthalic anhydride, 180 parts of linseed fatty acids, 60 parts raw castor oil, 80 parts glycerine and 37 parts dipentaerythritol were all charged into a reaction vessel and heated to 265° C. and held until the acid number of the reaction mixture was 12-15. A 40% solution of the reaction mixture in mineral spirits had a viscosity of E—H on the Gardner-Holdt varnish scale. This material may be pigmented with the usual enamel pigments in any color as for example toluidine red, chrome green, carbon black, titanium dioxide and others. It is particularly useful as a quick drying enamel vehicle for automobile refinishing.

*Example 7*

175 parts by weight of soya bean fatty acids, 75 parts of dehydrated castor oil, 148 parts of phthalic anhydride, 62 parts of glycerine and 43 parts of dipentaerythritol were heated to 220° C. in 2 hours in an oxygen-free atmosphere and held at this temperature until an acid number of less than 30 was obtained. A 50% mineral spirit solution of the reaction mixture had a viscosity of $Z_2$—$Z_3$ on the Gardner-Holdt scale.

*Example 8*

200 parts by weight of soya bean fatty acids, 75 parts of W. W. gum rosin, 147 parts of phthalic anhydride, 62 parts of glycerine and 43 parts of of dipentaerythritol were heated to 220° C. in 2 hours in an inert atmosphere and held at this temperature until an acid number of less than 20 was obtained. A 50% solution of the reaction mixture in mineral spirits had a viscosity of X—Y on the Gardner-Holdt scale.

*Example 9*

348 parts by weight of fumaric acid, 816 parts pinene, 207 parts of 98% glycerol and 1.5 parts of paratoluene sulfonic acid were charged into a vessel equipped with an agitator, theremometer, gas inlet tube, water trap and reflux condenser. An atmosphere of nitrogen was maintained in the flask during the reaction. The temperature of the charge was raised gradually to 165° C. over a period of 3 hours at which point the batch became clear. 231 parts od dipentaerythritol and 1530 parts of linseed fatty acids were then added and the temperature raised to the reflux point and held there for 10 hours. The reflux condenser was then removed from the vessel and the excess pinene was blown off in the next 4 hours during which time the temperature was raised to 195° C. The heating was continued for an additional 6 hours at 195° C., after removal of the pinene, and until the product had a viscosity of $Z_4$ and the acid number was 15.5.

*Example 10*

190 parts by weight of isomerized linseed oil fatty acids prepared in accordance with the method disclosed in my copending application Serial No. 378,060, 100 parts of dipentaerythritol and 99 parts of phthalic anhydride were heated according to the following schedule with agitation provided by a stream of carbon dioxide which was blown through the reaction mixture:

| Time | Temp. |
|---|---|
| *Minutes* | °*C.* |
| Start | Room temp. |
| 35 | 190 |
| 56 | 220 |
| 65 | 230 |
| 146 | 235 |

344 parts of the viscous resin was thinned with 172 parts of mineral spirits and 172 parts of αpinene. The viscosity of this 50% solution at 25° C. was between 63.4 and 98.5 poises ($Z_4$—$Z_5$ on the Gardner-Holdt scale) and the acid number of the solid resin was 28.3. The solution reduced to 40% solids by the addition of mineral spirits had a color of 5 on the varnish color system of the Institute of Paint and Varnish Research.

What I claim is:

1. An air drying alkyd resin of low acid number consisting essentially of the reaction product of diphentaerythritol, a polycarboxylic acid and unsaturated oil fatty acids.

2. An air drying alkyd resin of low acid number consisting essentially of the reaction product of dipentaerythritol, phthalic acid and soya bean oil fatty acids in amounts sufficient to yield an air drying alkyd resin of low acid number.

THEODORE F. BRADLEY.